(12) United States Patent
Guan et al.

(10) Patent No.: US 12,493,498 B2
(45) Date of Patent: Dec. 9, 2025

(54) WORKFLOW DATA REDISTRIBUTION IN HYBRID PUBLIC/PRIVATE COMPUTING ENVIRONMENTS

(71) Applicant: International Business Machines Corporation, Armonk, NY (US)

(72) Inventors: Zhi Li Guan, Beijing (CN); Peng Hui Jiang, Beijing (CN); Kun Yang, Beijing (CN); Jun Su, Beijing (CN); Bu Feng Hou, Beijing (CN); Cheng Wu, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 692 days.

(21) Appl. No.: 17/670,605

(22) Filed: Feb. 14, 2022

(65) Prior Publication Data

US 2023/0259406 A1    Aug. 17, 2023

(51) Int. Cl.
*G06F 15/16* (2006.01)
*G06F 9/50* (2006.01)

(52) U.S. Cl.
CPC .................. *G06F 9/5083* (2013.01)

(58) Field of Classification Search
None
See application file for complete search history.

(56) References Cited

U.S. PATENT DOCUMENTS 9,313,048 B2   4/2016  Chang et al.
10,491,662 B2  11/2019 Srikanth et al.
11,256,695 B1* 2/2022  He ................ G06F 16/2453
2015/0154211 A1* 6/2015 Matsubara ........... H04L 67/01
                                                    707/812
2015/0244597 A1  8/2015 Maes et al.
(Continued)

FOREIGN PATENT DOCUMENTS

CN    102263825 A    11/2011
CN    102413192 B    8/2016
(Continued)

OTHER PUBLICATIONS

International Search Report and Written Opinion dated May 12, 2023 for International Application No. PCT/EP2023/053467, 12 pages.
(Continued)

*Primary Examiner* — Alex Gofman
(74) *Attorney, Agent, or Firm* — CHIP LAW GROUP

(57) ABSTRACT

Mechanisms are provided for workflow data redistribution in a hybrid computing environment comprising a private portion and a public portion of the hybrid computing environment. A received user request, that is serviced by a workflow executed by one or more computing devices of the hybrid computing environment, is parsed to extract criteria of the workflow for servicing the user request. It is determined whether a catalog data structure exists in a public catalog data store of the public portion that satisfies the criteria of the workflow and if not, the user request is processed in a workflow manager computing system of the private portion to generate a catalog that satisfies the criteria of the workflow and generate a result. A portion of the catalog is redistributed by storing the portion of the catalog in the public catalog data store of the public portion.

16 Claims, 8 Drawing Sheets

(56) References Cited

U.S. PATENT DOCUMENTS

| | | | |
|---|---|---|---|
| 2016/0164753 A1* | 6/2016 | Cimprich | G06F 9/5011 |
| | | | 709/222 |
| 2017/0076105 A1 | 3/2017 | Paulovicks et al. | |
| 2017/0264703 A1 | 9/2017 | Bisti et al. | |
| 2021/0124764 A1* | 4/2021 | Kaul | G06F 16/211 |
| 2021/0250400 A1 | 8/2021 | Chu et al. | |

FOREIGN PATENT DOCUMENTS

| | | |
|---|---|---|
| CN | 103369027 B | 3/2017 |
| CN | 107241384 A | 10/2017 |
| CN | 113742304 A | 12/2021 |
| EP | 2648370 B1 | 12/2016 |
| IN | 201921026238 A | 12/2020 |
| WO | 2023/152364 A1 | 8/2023 |

OTHER PUBLICATIONS

"Madam Adit: Running Presto in a Hybrid Cloud Architecture", https://prestodb.io/blog/2020/07/17/alluxio-hybrid-cloud, Jul. 17, 2020, 7 pages.

Mansouri, Yaser et al., "An automated implementation of hybrid cloud for performance evaluation of distributed databases", Journal of Network and Computer Applications, vol. 167, Oct. 2020, 14 pages.

* cited by examiner

WORKFLOW DATA REDISTRIBUTION IN HYBRID PUBLIC/PRIVATE COMPUTING ENVIRONMENTS

BACKGROUND

The present application relates generally to an improved data processing apparatus and method and more specifically to computer technology mechanisms for performing workflow data redistribution topology optimization in hybrid public/private computing environments.

Distributed computing environments have provided an infrastructure upon which various types of computing architectures have been developed. One such computing architecture is the cloud computing architecture. Cloud computing is on-demand access, via a distributed data network, such as the internet, to computing resources including applications, servers (physical servers and virtual servers), data storage, development tools, networking capabilities, and more. These computing resources are hosted at a remote data center managed by a cloud services provider (or CSP). The CSP makes these resources available for a monthly subscription fee or bills them according to usage.

Compared to traditional on-premises information technology (IT), and depending on the cloud services one selects, cloud computing helps do the following:

1. Lower IT costs: Cloud computing lets clients offload some or most of the costs and effort of purchasing, installing, configuring, and managing their own on-premises infrastructure;
2. Improve agility and time-to-value: With cloud computing, an organization can start using enterprise applications in minutes, instead of waiting weeks or months for IT personnel to respond to a request, purchase and configure supporting hardware, and install software. Cloud computing also lets empowers certain users, e.g., developers and data scientists, to help themselves to software and support infrastructure; and
3. Scale more easily and cost-effectively: Cloud computing provides elasticity in that, instead of purchasing excess capacity that sits unused during slow periods, clients can scale capacity up and down in response to spikes and dips in traffic.

The term "cloud computing" also refers to the underlying technology that makes cloud computing services work. This includes virtualized IT infrastructure, e.g., servers, operating system software, networking, and other infrastructure that is abstracted, using special software, so that it can be pooled and divided irrespective of physical hardware boundaries. For example, a single hardware server can be divided into multiple virtual servers. Virtualization enables cloud providers to make maximum use of their data center resources.

Not surprisingly, many corporations have adopted the cloud delivery model for their on-premises infrastructure, so they can realize maximum utilization and cost savings versus traditional IT infrastructures, and still offer the same self-service and agility to their end-users.

SUMMARY

This Summary is provided to introduce a selection of concepts in a simplified form that are further described herein in the Detailed Description. This Summary is not intended to identify key factors or essential features of the claimed subject matter, nor is it intended to be used to limit the scope of the claimed subject matter.

In one illustrative embodiment, a method, in a data processing system, is provided for workflow data redistribution in a hybrid distributed data processing system environment comprising a private portion of the hybrid distributed data processing system environment and a public portion of the hybrid distributed data processing system environment. The method comprises parsing a received user request, that is serviced by a workflow executed by one or more computing devices of the hybrid distributed data processing system environment, to extract criteria of the workflow for servicing the user request. The method further comprises determining whether a catalog data structure exists in a public catalog data store of the public portion that satisfies the criteria of the workflow. Moreover, the method comprises, in response to determining that a catalog data structure does not exist in the public catalog data store, processing the user request in a workflow manager computing system of the private portion to generate a catalog that satisfies the criteria of the workflow, and processing the user request to generate a result that is returned to a source computing system from which the user request was received. In addition, the method comprises redistributing at least one portion of the catalog by storing the at least one portion of the catalog in the public catalog data store of the public portion. The at least a portion of the catalog comprises at least one of data from at least one backend database of the private portion that does not include private data or data derived from private data stored in the at least one backend database of the private portion that does not include private data. The method redistributes workflow data so as to optimize servicing user requests received via the public portion, while maintaining security of private data in the private portion.

In some illustrative embodiments, the workflow data comprises online transaction processing (OLTP) data and online analytical processing (OLAP) catalog data, and wherein the at least one portion of the catalog comprises the OLAP catalog data but not the OLTP data. By maintaining the OLTP data in the private portion and redistributing OLAP catalog data to the public portion, servicing user requests using the OLAP catalog data is made more efficient and reduces latency while the OLTP data is maintained secure in the private portion.

In some illustrative embodiments, generating the catalog comprises generating catalog data that provides non-private data upon which the result is generated, and a catalog schema corresponding to the catalog data, wherein the catalog schema comprises a definition of metadata details of the catalog data that maps the criteria of the workflow with the catalog data. The catalog schema provides a mechanism by which a search or lookup of catalog data meeting user request workflow requirements may be made so as to quickly retrieve previously generated catalogs rather than having to spend computational resources and deal with latencies associated with generating catalogs for which catalogs have previously been generated.

In some illustrative embodiment, determining if a catalog data structure exists in the public catalog data store comprises searching a public catalog schema database of the public portion for an entry having a definition of metadata that matches criteria of the workflow corresponding to the user request. Again, by searching the public catalog schema database, a previously generated catalog may be identified that satisfies the workflow requirements for servicing a user request so as to be able to retrieve that previously generated catalog data and service the user request with less latency and greater user satisfaction.

In some illustrative embodiments, generating the catalog further comprises: determining if a previously generated catalog exists in a private catalog data store that satisfies the criteria of the workflow; in response to the previously generated catalog existing in the private catalog data store, returning the catalog from the private catalog data store to a computing device in the public portion to service the user request and updating a usage statistic of the catalog in a corresponding entry of the private catalog data store; and in response to the previously generated catalog not existing in the private catalog data store, generating the catalog from a processing of backend database data in the private portion and storing the catalog in the private catalog data store. In some illustrative embodiments, the method further comprises determining if the usage statistic value of the corresponding entry being equal to or above a predetermined threshold usage statistic value, wherein in response so the usage statistic value of the corresponding entry being equal to or above the predetermined threshold usage statistic value, the redistributing of the at least one portion of the catalog by storing the at least one portion of the catalog in the public catalog data store of the public portion is performed. In such embodiments, the private portion may also store previously generated catalogs so as to reduce latencies in servicing requests. Moreover, usage statistics may be maintained to allow for a determination basis for redistributing catalogs between the private and public portions so as to optimize request servicing without unnecessarily exposing private data. That is, based on the usage statistics, the catalogs that are more often used to service user requests may be redistributed to the public portion to service user requests more quickly and with less computational resources.

In some illustrative embodiments, the predetermined threshold usage statistic value is a top-X threshold usage statistic value specifying a predetermined number of highest usage catalogs, where X is the predetermined number of highest usage catalogs. In such embodiments, the highest usage catalogs may be redistributed to the public portion since they are more often used to satisfy user requests and their presence in the public portion will reduce latency and increase user satisfaction with the system as a whole.

In some illustrative embodiments, the method further comprises linking an entry in the private catalog data store with a corresponding entry in the public catalog data store, and automatically updating the catalog data corresponding to the entry in the public catalog data store based on updates to the linked entry in the private catalog data store based on the linkage between the entry in the private catalog data store and the corresponding entry in the public catalog data store. In this way, when there are updates to the backend databases which cause updates to the privately stored catalogs, the linkage can be used to update the publicly stored versions of the catalogs so as to maintain the privately held and publicly held catalogs consistent and up-to-date.

In some illustrative embodiments, the public catalog data store is one of a plurality of public catalog data stores, each public catalog data store being associated with a different region of an organization, and wherein the method is performed on a regional basis for user requests originating from computing devices associated with the different regions of the organization. In such illustrative embodiments, regional awareness is made possible such that the public catalog data stores store the catalogs that the users associated with that region more often utilize. In this way, the public catalog data stores are customized to the particular usage patterns of the users of the various regions.

In some illustrative embodiments, the hybrid distributed data processing system environment is a hybrid cloud computing environment. Hybrid cloud computing environments provide an efficient mechanism for providing private data storage and access while providing the scalability of public networks and distributed data storage and computer resources. The mechanisms of these illustrative embodiments operate to improve upon hybrid cloud computing environments by providing a mechanism to optimize user requests serviced via public clouds while maintaining privacy of private data held by organizations employing such hybrid cloud computing environments.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION

Figure 1:
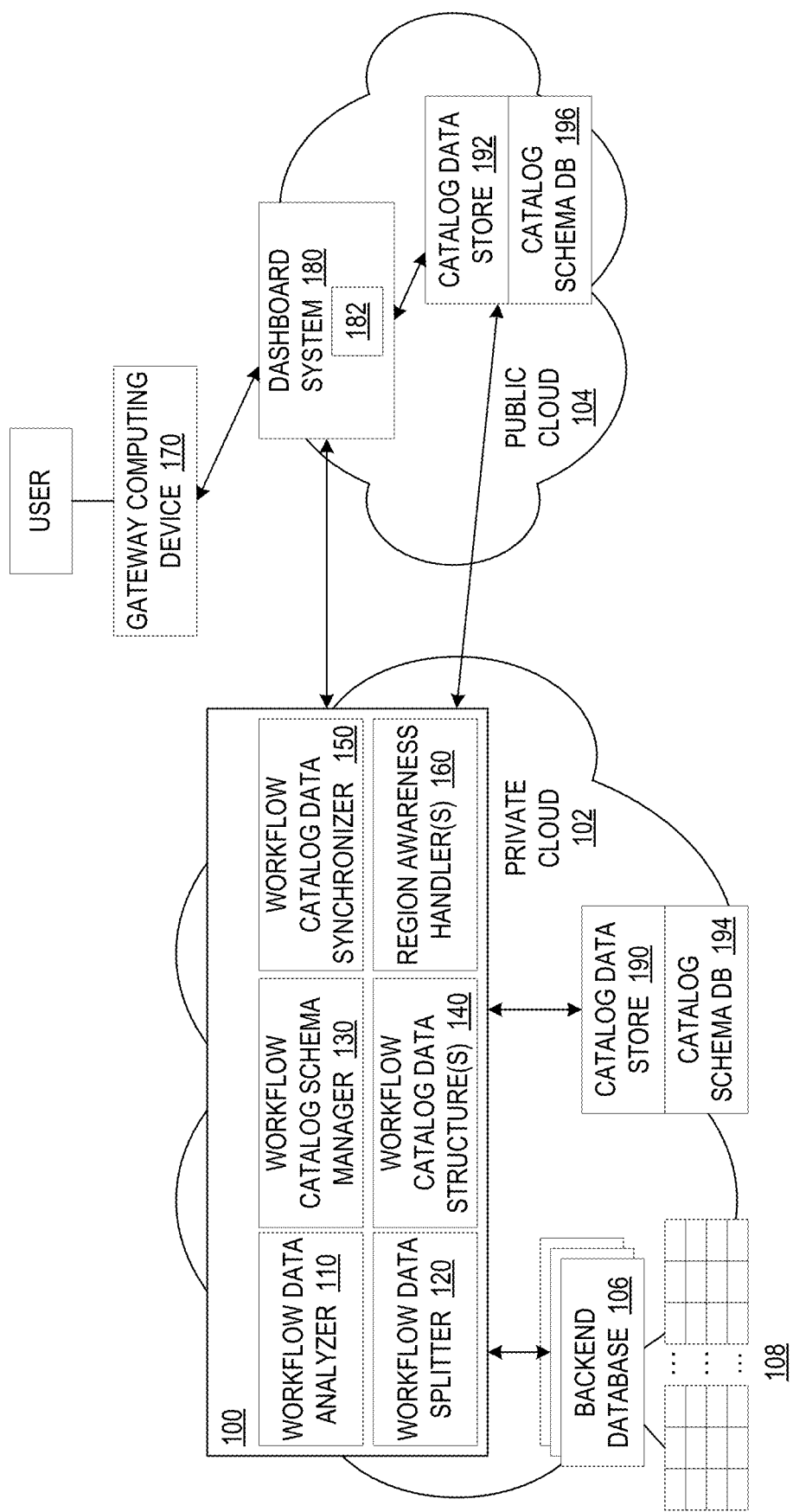
FIG. 1 is an example diagram of a hybrid private/public cloud computing system in which components of a hybrid computing environment workflow data redistributor are provided in accordance with one illustrative embodiment.

As mentioned above, distributed computing environments have led to the advent of various types of computing architectures that take advantage of the distributed data processing and distributed data storage capabilities of these environments. One such computing architecture is the cloud computing architecture. In turn, such computing architectures have served as a basis for various additional improved techniques for leveraging distributed computing capabilities. One improved technique of interest is that of a hybrid public/private computing environment, such as a hybrid cloud computing environment. In such a hybrid public/private computing environment, some computing resources, e.g., computing devices, peripheral devices, applications, data structures, etc., exist within a publicly accessible portion of the computing environment while other computing resources exist within a privately accessible portion of the computing environment, which can only be accessed from within the privately accessible portion of the computing environment or by computing devices/users that have appropriate security credentials, where the private portion comprises mechanisms that restrict computing devices and users without the proper security credentials from accessing the private computing resources. That is, while there are mechanisms provided for accessing both the publicly/privately usable computing resources, these mechanisms operate to allow for accessing the privately usable computing resources in a manner that does not expose secured computing resources present in the privately accessible portion to the publicly accessible portion of the computing environment, e.g., anonymization mechanisms, summarization mechanisms, filters, and the like.

These hybrid computing environments, such as hybrid cloud computing environments, give organizations the benefits of both a private computing environment (or private cloud) and a public computing environment (or cloud). For example, with regard to private cloud benefits, the organization is able to maintain control over the visibility of their computing resources outside of the organization and provide the ability to leverage the existing infrastructure and facilities in which the organization has invested. Public cloud benefits include flexibility, cost savings, and the ability to quickly scale computing resources to meet needs. The hybrid computing environment provides mechanisms through which applications and components may interoperate across the boundaries between public and private computing environments, while maintaining the security of the computing resources.

While hybrid computing environments provide significant benefits, there are still limitations that present inefficiencies and performance degradation as well as other challenges that should be addressed. One such inefficiency and performance degradation comes in the form of significant delays in servicing requests due to the hybrid nature of the computing environment and the need to maintain security of the private computing resources. That is, if a request, originating from a public portion of the hybrid computing environment requires that private computing resources, e.g., data structures, applications, computing devices, etc., be utilized to service the request, then the work, e.g., accessing data, processing the data, and generating results that can be disclosed to the public portion of the hybrid computing environment, must be performed within the private portion of the hybrid computing environment and a result that is suitable for the public portion returned to the requestor, i.e., a result that does not expose private computing resources. This would be required each time a request is submitted that needs access to privately held computing resources. Furthermore, the requests may have various combinations of different criteria that make many of these requests different such that each of the requests need to be separately processed within the private portion of the hybrid computing environment. Moreover, if an organization is large, with many regional private portions of the hybrid computing environment, network delays may impact performance due to cross-regional computing resource accesses, e.g., a request may require private computing resources from various different regions, which may be physically and/or network topology distant regions of the organization's private cloud, which leads to network delays.

For example, assume that a user accessing a public portion of the hybrid computing environment for a financial institution wishes to obtain a report detailing the 2021 loan statistics grouped by month, then a separate report of the total loan statistics compared with the loan statistics of the past 5 years. In order to generate each report, the hybrid computing system must access privately held data regarding the various loans of that financial institution for the year 2021, which is private business data that the financial institution does not want to expose to the public portion of the hybrid computing environment, e.g., the private business data may include the specific identities of the individuals/organizations that have obtained loans, their addresses, phone numbers, etc. As a result, in order to service each request, the hybrid computing environment must perform operations within the private portion of the hybrid computing environment in order to maintain the security of the privately held data, and then generate a report in which such privately held data is anonymized prior to sending the anonymized report out to the requestor in the public portion of the hybrid computing environment. This would need to be separately performed for each request, since each request has different criteria for generating the report.

To address such inefficiencies, performance degradations, and challenges of hybrid computing environments, of which a hybrid cloud computing environment will be used herein as an example, the illustrative embodiments provide an improved computing tool and improved computing tool operations that perform workflow data redistribution topology optimization in hybrid public/private computing environments. Workflow is a sequence of tasks that occur in a particular order. In the context of the present description, the workflow is the sequence of tasks performed to service a request, where these tasks may include a first set of tasks performed in a public portion of the hybrid computing environment and a second set of tasks performed in a private portion of the hybrid computing environment. The illustrative embodiments provide an improved computing tool and improved computing tool operations that redistribute the tasks and data associated with these tasks, so as to optimize performance of the workflow across the public and private portions of a hybrid computing environment and address the inefficiencies, performance degradations, and challenges of existing hybrid computing environments as discussed above.

The improved computing tool of the illustrative embodiments operates to provide a workflow management tool that processes requests from users by analyzing workflow data for processing the request and splitting the workflow efficiently between private and public cloud portions of a hybrid cloud computing environment as well as repositioning workflow catalog data from the private cloud portion to the public cloud portion based on usage statistics. These operations are all performed while maintaining the security of the privately held computing resources in the private cloud, yet repositioning workflow data so as to optimize servicing requests from users. It should be appreciated that while the illustrative embodiments will reference a private cloud and a public cloud, the illustrative embodiments are not limited to such and instead may be applied to any distributed data processing system architecture which there is a private portion and public portion with security mechanisms to maintain computing resources in the private portion secure relative to the computing resources in the public portion.

As noted above, the illustrative embodiments provide an improved computing tool that implements workflow management and thus, may be considered a workflow management tool. Workflow management creates and optimizes the paths for data in order to complete items in each process or task of a workflow. Workflow management includes finding redundant tasks, mapping out the workflow in an ideal state, automating the processes or tasks, and identifying bottlenecks or areas for improvement. The workflow system contains both system data and business data. This business data may be private to the particular business or organization and may be maintained within the private cloud such that it is not accessible in its private form outside of the private cloud.

The workflow management performed by the mechanisms of the improved computing tool of the illustrative embodiments operates to receive a request at a gateway computing device which operates to perform load balancing and request routing. The gateway computing device may route the user requests initially to a public cloud computing resource initially to determine if a catalog exists in the public cloud to service the request. Servicing the request comprises execution of computer operations to generate results that satisfy criteria of the request and provide those results back to the requestor (user's computing device).

A data catalog, or simply catalog, is one or more data structures that provide an organized inventory of data assets and provides metadata for assisting with the organization and use of the data assets. The catalog may be used to compile data assets to generate a result for servicing a user request from publicly stored catalog data. In the context of the present description, the catalog may be specific to the particular request that is being serviced and thus, represents an inventory of the data assets that are utilized to service the request. For example, if a user requests annual loan statistics, the user request may be processed inside the private cloud using privately held data structures, e.g., business data specifying individual loan details for the organization which may comprise data that is to be maintained secure, such as borrower identities, contact information, financial status information, and the like. The results generated from the processing inside the private cloud may convert secure data to a form that is able to be accessed via the public cloud and which does not expose private data, e.g., rather than releasing private information about borrowers retrieved from privately held databases in the above example, the request is processed to generate statistical information to service the request, which anonymizes the data and provides only the statistical information rather than the private information. For example, the mechanisms of the illustrative embodiments provide a workflow data splitter that splits the data for servicing the request into online transaction processing (OLTP) business data that is stored within the private cloud with raw data of the backend databases, and online analytical processing (OLAP) catalog data, which is calculated based on the raw business data of the backend databases, but does not expose private information and thus, can be stored in the public cloud.

Thus, the data catalog, or catalog, comprises the OLAP catalog data and metadata that provides a basis for generating a response to the user request. This response may be a graphical representation of the results satisfying the criteria of the user request, e.g., a graphical display depicting the requested data, such as a bar graph or the like. The catalog may be stored in a catalog data store in the private cloud when it is generated and may be redistributed to the public cloud and stored in a public cloud catalog data store when the mechanism of the illustrative embodiment determine that such redistribution is warranted, as described hereafter. For example, when the catalog is determined to have a level of usage, based on maintained usage statistics, that the hybrid cloud computing environment would operate more efficiently by relocating, or copying, the catalog data and catalog schema to the public cloud, then such redistribution may be performed.

The data catalog has an associated catalog schema which may be stored in a catalog schema database. The catalog schema provides a definition or description of the metadata details for providing resulting catalogs to service requests. In a sense, the catalog schema provides a mapping between the catalog data and the user request in that the catalog schema is correlated in the catalog schema database with the criteria of a user request that was the basis for the generation of the catalog data, and is also mapped to the catalog data associated with the catalog schema. For example, a catalog schema may map catalog data to a query language statement, such as a Structured Query Language (SQL) statement, which is used to access backend databases in the private cloud to generate the catalog. The query language statement will specify the criteria for the query which may be matched to a current user request. Moreover, the corresponding entry will also specify the catalog data generated as a result of processing the query language statement. Hence, by comparing user request criteria to user request criteria specified in entries of the catalog schema database, one or more corresponding catalog schema having matching user request criteria may be identified and used to retrieve corresponding catalog data to generate a response to a user request.

When a catalog is generated to respond to a user request, the catalog schema is also created and stored in a corresponding catalog schema database. The catalog schema database may be used as a basis for searching to find previously generated catalogs that will adequately respond to a user request. Moreover, usage statistics may be maintained in association with various catalog schema entries in the catalog schema database in order to perform operations, described hereafter, for managing the storage locations of catalog data between the private and public clouds. For example, a user may submit a request and the criteria of the request may be used as a basis to perform a search of the catalog schema database to determine if a catalog has been previously generated for servicing that request and if so, provide the corresponding catalog as a result for the user request, thereby eliminating the need to recreate the previously generated catalog within the private cloud. Moreover, usage statistics may be used as a basis for discriminating between which catalogs and corresponding catalog schema should be maintained in which regions of the public cloud based on a "top-click" statistics measure or the like, as discussed hereafter.

In response to the gateway computing device determining that there is no existing catalog present in the public cloud's catalog data store that is sufficient for servicing the user request, the user request may be routed to the private cloud, where again a determination may be made as to whether there is an existing catalog to service the request or if a new catalog and corresponding catalog schema must be generated to service the request. In response to a determination that a previously generated catalog does not already exist in the private catalog store, a workflow data analyzer operates to identify the user request criteria from the user request and analyze access patterns to thereby generate a catalog and corresponding catalog schema based on privately held business data of one or more backend databases. Access patterns define how the users and the system access the data to satisfy business needs. For workflow-based access pattern analysis, the analysis comprises determining what kind of pattern is used to access workflow catalog data, such as which workflow, or tasks in the workflow, are used frequently, which task or task set represent bottlenecks, which kind of tenants are using what kind of workflow, what kind of workflow is processor-intensive, or input/output intensive, and the like. Access pattern analysis is generally known in the art and thus, a more detailed description is not provided herein.

For example, one or more query language statements, such as SQL statements, for example, may be generated based on the user request's specified criteria and the query language statement(s) may be executed against one or more backend databases in the private cloud. The resulting data obtained as a result of the execution of the query language statement(s) on the backend database(s) may be anonymized or otherwise analyzed to generate resulting catalog data in which private information is not exposed. The resulting catalog data may be stored as an existing catalog in a catalog data store of the private cloud and a corresponding catalog schema entry generated in the catalog schema database of the private cloud, which may include usage metrics or statistics values which may be updated to reflect the amount of usage within a given time of the catalog data, e.g., how many times a user has submitted a request that is serviced by the corresponding catalog data, also referred to as a "top-click" statistic or metric.

The illustrative embodiments further include a workflow catalog schema manager which provides a linkage between the catalog data in the public cloud and the catalog data in the private cloud. The workflow catalog schema manager manages the catalog schema database and maintains usage metrics or statistics regarding the usage of catalogs and the corresponding catalog schemas to service user requests. The workflow catalog schema manager further evaluates the usage metrics to determine which catalogs and corresponding catalog schemas should be redistributed to the public cloud, and/or regions of the public cloud, based on redistribution usage criteria and corresponding evaluation logic. The workflow catalog schema manager may dynamically redistribute catalogs and catalog schemas between the private and public clouds based on usage metric or statistics and redistribution usage criteria, such as by swapping in/out catalogs and catalog schemas in the public cloud catalog and catalog schema stores, potentially on a regional basis as described hereafter.

In addition, the illustrative embodiments further provide a workflow catalog data synchronizer that operates to update the workflow catalog data present in the private/public clouds for previously generate catalogs so that they are up to date. This updating may be performed automatically on a scheduled basis, or may be performed in response to an automated or manually generated request to perform an update of existing workflow catalog data. Thus, while previously generated catalogs may be stored in catalog data stores along with their catalog schemas being stored in the corresponding entries of catalog schema databases in the private and/or public clouds, updates to the underlying business data in the backend databases of the private cloud may occur and would not be reflected in the previously stored catalog data. The workflow catalog data synchronizer provides a mechanism to maintain these stored catalogs in an updated state. It should be appreciated that the updating of the stored catalog data may occur with regard to only a subset of stored catalogs, e.g., only the stored catalogs that are present in the public catalog data store.

In some illustrative embodiments, middleware nodes in the public cloud portion of the hybrid private/public cloud computing environment may be augmented to include a region awareness handler and may store catalog data and corresponding catalog schemas in regional catalog data stores and catalog scheme databases that are closer in distance, in terms of physical and/or network topology distance, to the end users that utilize the catalogs to service requests. The region awareness handler may operate to request catalog data and catalog schemas from the private cloud catalog data store and catalog schema databases that are utilized more often by users of the corresponding regions of the public cloud for storage in the corresponding regional stores. In this way, the latency in accessing these catalogs is reduced as the catalog data and catalog schema are stored more local to the users that are utilizing the catalog data to service user requests.

Thus, the illustrative embodiments provide a workflow data redistribution computing tool that operates specifically with regard to a hybrid private/public cloud computing environment and redistributes catalog data and corresponding catalog schemas between the private and public portions of the hybrid private/public cloud. The mechanisms of the improved computing tool of the illustrative embodiments operate to redistribute catalog data to the public cloud stores based on usage metrics and statistics which reduces latency in servicing user requests and improves user experiences. This improvement is further enhanced when regional awareness with regard to regional catalog data stores is implemented with the mechanisms of the illustrative embodiments. The improved computing tool of the illustrative embodiments provides such improvements in user request servicing by a hybrid computing environment while maintaining the security of sensitive data within the private cloud portion of the hybrid computing environment since the sensitive data is not made accessible by, and is not released to, the public cloud, only the OLAP catalog data is made available to the public cloud when user requests are serviced and when usage metrics indicate public cloud redistribution of catalog data is warranted.

Before continuing the discussion of the various aspects of the illustrative embodiments and the improved computer operations performed by the illustrative embodiments, it should first be appreciated that throughout this description the term "mechanism" will be used to refer to elements of the present invention that perform various operations, functions, and the like. A "mechanism," as the term is used herein, may be an implementation of the functions or aspects of the illustrative embodiments in the form of an apparatus, a procedure, or a computer program product. In the case of a procedure, the procedure is implemented by one or more devices, apparatus, computers, data processing systems, or the like. In the case of a computer program product, the logic represented by computer code or instructions embodied in or on the computer program product is executed by one or more hardware devices in order to implement the functionality or perform the operations associated with the specific "mechanism." Thus, the mechanisms described herein may be implemented as specialized hardware, software executing on hardware to thereby configure the hardware to implement the specialized functionality of the present invention which the hardware would not otherwise be able to perform, software instructions stored on a medium such that the instructions are readily executable by hardware to thereby specifically configure the hardware to perform the recited functionality and specific computer operations described herein, a procedure or method for executing the functions, or a combination of any of the above.

The present description and claims may make use of the terms "a", "at least one of", and "one or more of" with regard to particular features and elements of the illustrative embodiments. It should be appreciated that these terms and phrases are intended to state that there is at least one of the particular feature or element present in the particular illustrative embodiment, but that more than one can also be present. That is, these terms/phrases are not intended to limit the description or claims to a single feature/element being present or require that a plurality of such features/elements be present. To the contrary, these terms/phrases only require at least a single feature/element with the possibility of a plurality of such features/elements being within the scope of the description and claims.

Moreover, it should be appreciated that the use of the term "engine," if used herein with regard to describing embodiments and features of the invention, is not intended to be limiting of any particular implementation for accomplishing and/or performing the actions, steps, processes, etc., attributable to and/or performed by the engine. An engine may be, but is not limited to, software executing on computer hardware, specialized computer hardware and/or firmware, or any combination thereof that performs the specified functions including, but not limited to, any use of a general and/or specialized processor in combination with appropriate software loaded or stored in a machine readable memory and executed by the processor to thereby specifically configure the processor to perform the specific functions of the illustrative embodiments. Further, any name associated with a particular engine is, unless otherwise specified, for purposes of convenience of reference and not intended to be limiting to a specific implementation. Additionally, any functionality attributed to an engine may be equally performed by multiple engines, incorporated into and/or combined with the functionality of another engine of the same or different type, or distributed across one or more engines of various configurations.

In addition, it should be appreciated that the following description uses a plurality of examples for various elements of the illustrative embodiments to further illustrate example implementations of the illustrative embodiments and to aid in the understanding of the mechanisms of the illustrative embodiments. These examples intended to be non-limiting and are not exhaustive of the various possibilities for implementing the mechanisms of the illustrative embodiments. It will be apparent to those of ordinary skill in the art in view of the present description that there are many other alternative implementations for these various elements that may be utilized in addition to, or in replacement of, the examples provided herein without departing from the spirit and scope of the present invention.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As discussed previously, and in further detail hereafter, the present invention may be a specifically configured computing system, configured with hardware and/or software that is itself specifically configured to implement the particular mechanisms and functionality described herein, a method implemented by the specifically configured computing system, and/or a computer program product comprising software logic that is loaded into a computing system to specifically configure the computing system to implement the mechanisms and functionality described herein and provide an improved computing tool and improved computing tool operations. Whether recited as a system, method, of computer program product, it should be appreciated that the illustrative embodiments described herein are specifically directed to an improved computing tool and the methodology implemented by this improved computing tool. In particular, the improved computing tool of the illustrative embodiments specifically provides a hybrid computing environment workflow redistributor. The improved computing tool implements mechanism and functionality, such as catalog generation, catalog schema generation, data splitting and synchronization, catalog data usage metric monitoring, catalog data redistribution between a private and public portion of a hybrid computing environment, regional awareness handling for catalog data, automated routing of requests amongst private and public portions of the hybrid computing environment, and the like, which cannot be practically performed by human beings either outside of, or with the assistance of, a technical environment, such as a mental process or the like. The improved computing tool provides a practical application of the methodology at least in that the improved computing tool is able to automatically redistribute catalog data between private and public portions of a hybrid computing environment to optimize workflows while maintaining security or sensitive information within the private portion of the hybrid computing environment.

FIG. 1 is an example diagram of a hybrid private/public cloud computing system in which components of a hybrid computing environment workflow data redistributor are provided in accordance with one illustrative embodiment. As shown in FIG. 1, the improved computing tool of the illustrative embodiments, referred to as the hybrid cloud computing environment workflow data redistributor 100, which will be referred to as the "hybrid workflow data redistributor" 100 herein for simplicity, includes a variety of components which may include a workflow data analyzer 110, a workflow data splitter 120, a workflow catalog schema manager 130, workflow catalog data structures 140, workflow catalog data synchronizer 150, and one or more region awareness handlers 160. These components may also operate with other components including one or more workflow data gateway computing devices 170, as well as private and public cloud catalog stores 190, 192 and private and public cloud catalog schema databases 194, 196. It should be appreciated that it is not necessary that all of these components be present in an embodiment, or that each of these components be provided as separate components in the same or different computing devices. To the contrary, embodiments of the present invention may include a subset of these components and the particular components implemented in the embodiments may be implemented with the same or different specially configured computing devices. In other words, while one example illustrative embodiment will be provided that includes all of these components for completeness of description, it will be readily apparent to those of ordinary skill in the art that other illustrative embodiments may include only subsets of these components, components that have been combined, or other distributions of components across multiple different specially configured computing devices, which may differ from the example illustrative embodiment described herein, but still are considered to be within the spirit and scope of the present invention.

The mechanisms of the illustrative embodiments are specifically directed to redistribution of data in a hybrid computing environment between at least one private portion 102 of the hybrid computing environment, e.g., a private cloud 102, and at least one public portion 104 of the hybrid computing environment, e.g., public cloud 104. In at least one illustrative embodiment, the private cloud 102 and public cloud 104 may together constitute a hybrid cloud computing environment for a user or organization, where these cloud computing environments may be provided by one or more cloud services providers (CSPs) (not shown) that provide hardware and software computing resources to facilitate the hybrid cloud computing environment. The CSPs may host a plurality of private/public clouds for a plurality of different users or organizations, with each separate user or organization having their own hybrid cloud computing environment through virtualization mechanisms provided by the CSPs. In at least some of the illustrative embodiments, the private cloud portion of a user/organization's hybrid cloud computing environment may be maintained separate but connected to the public cloud computing environment through various known security mechanisms in hybrid cloud computing, whereas the public cloud computing environment is accessible by users via one more data networks that are freely accessed, such as in the case of the Internet.

As noted above, it is important to protect the business data 108 stored in the backend databases 106 of the private cloud 102 against unauthorized access or distribution of such sensitive, private information, by users who only have access via the public cloud computing environment 104. Moreover, it is important to service requests by users received via the public cloud computing environment 104 without exposing this sensitive, private information, e.g., online transaction processing (OLTP) business data, and instead only providing online analytical processing (OLAP) catalog data, i.e., data derived from the business data 108 stored in the backend databases 106, which does not include any sensitive, private information. However, it is further important to reduce latency in such hybrid cloud computing environments and improve user request servicing by reducing lag in providing results to users, while still maintaining the security and privacy of the sensitive, private information. The illustrative embodiments provide the hybrid workflow redistributor 100 and its associated components, e.g., region awareness handler(s) 160, workflow data gateway computing device(s) 170, catalog stores 190, 192 and catalog schema databases 194, 196, that operate to achieve such improved performance and reduced latency while maintain security.

In one example illustrative embodiment, as shown in FIG. 1, the hybrid workflow redistributor 100 is an improved computing tool, comprising one or more specifically configured computing devices, that are specifically configured to provide, among other components, a workflow data analyzer 110 which comprises logic and is configured to specifically, and automatically, execute computer operations that extract criteria from user requests and analyze business data 108 in one or more backend databases 106 of a private cloud to generate catalog data and a corresponding catalog schema for executing a corresponding workflow, e.g., series of tasks, to service the user request and provide results that may be returned to the user via one or more user dashboards via a publicly available dashboard module 180 and the gateway computing device 170 (see FIG. 1).

The hybrid workflow redistributor 100 further includes a workflow data splitter 120 which comprises logic and is configured to specifically, and automatically, execute computer operations that splits, or distinguishes, the data used to service a user request in the private cloud 102 into OLTP business data 108, which may include private, sensitive information, and OLAP catalog data 140, also referred to as workflow catalog data 140, which does not include any private, sensitive information, and instead comprises only portions of the backend business data 108 from the backend database(s) 106 that is determined to be non-sensitive, and/or data that is derived from the backend business data 108 but is otherwise anonymized or generated such that any underlying private, sensitive information that is used to generate the workflow (OLAP) catalog data 140 is obfuscated. For example, the OLTP business data 108 may comprise identities of individuals and their corresponding data values, but the workflow catalog data 140 does not include such identities and only provides aggregate statistical measurement data that cannot be used to identify individuals.

It should be appreciated that the workflow data splitter 120 may be specifically configured to identify particular types of information present in the backend business data 108 that is determined to be sensitive or private for the particular user/organization. That is, configuration data may be provided in the workflow data splitter 120 that specifies data types that are considered to be private or sensitive, whether alone or in combination with other data of other data types. For example, a medical user/organization may specify a city/state to be private since, if it is combined with a patient's medical condition and first name, this combination of data may be used to uniquely identify a particular patient. The level of sensitivity and the types of data that may be identified as private or sensitive will depend on the particular user/organization and their desired implementation, but is configurable within the workflow data splitter 120. Thus, the workflow data splitter 120 may apply such configuration data to the backend business data 108 when servicing requests to determine what data can and cannot be included on the workflow (OLAP) catalog data 140, e.g., data having a data type matching a data type indicated to be private/sensitive is not included in the workflow catalog data 140, however data derived from such private/sensitive data may be included in the workflow catalog data 140.

The illustrative embodiments further include a workflow catalog schema manager 130 which provides a linkage between the catalog data in the public cloud and the catalog data in the private cloud. The workflow catalog schema manager 130 comprises logic and is configured to specifically, and automatically, execute computer operations that manage the catalog schema databases 194, 196 and maintain usage metrics or statistics regarding the usage of catalogs in the catalog data store 190 and the corresponding catalog schemas to service user requests. The workflow catalog schema manager 130 further evaluates the usage metrics to determine which catalogs in the private cloud's catalog data store 190, and corresponding catalog schemas in the private cloud's catalog schema database 194, should be redistributed to the public cloud 104, and/or regions of the public cloud, based on redistribution usage criteria and corresponding evaluation logic of the workflow catalog schema manager 130. The workflow catalog schema manager 130 further operates to direct operations to swap in/out catalogs and catalog schema between the private cloud 102 and public cloud 104 catalog data stores 190, 192 and catalog schema database 194, 196. The workflow catalog schema manager may direct dynamic redistribution of the catalogs and catalog schemas between the private and public clouds 102, 104 based on usage metric or statistics and redistribution usage criteria, such as by swapping in catalogs and catalog schema to the public cloud 104 when usage metrics meet or exceed a threshold usage metric within a predefined period of time, e.g., daily, weekly, or monthly, and swapping out catalogs and catalog schemas in the public cloud 104, or otherwise removing, overwriting, or making inaccessible these catalogs and catalog schemas in the public cloud's catalog data store 192 and catalog schema database 196, when the usage metrics fall below the predetermined usage metric threshold for the predetermined period of time. This management may be performed on a regional basis, as will be described in greater detail hereafter.

The workflow catalog data synchronizer 150 of the hybrid workflow redistributor 100 comprises logic and is configured to specifically, and automatically, execute computer operations that operate to update the workflow catalog data 140 present in the private/public clouds 102, 104 for previously generated catalogs so that they are up to date. This updating may be performed automatically on a scheduled basis, or may be performed in response to an automated or manually generated request to perform an update of existing workflow catalog data. Thus, while previously generated catalogs may be stored in catalog data stores 190, 192 along with their catalog schemas being stored in the corresponding entries of catalog schema databases 194, 196 in the private and/or public clouds 102, 104, updates to the underlying business data 108 in the backend databases 106 of the private cloud 102 may occur and would not be reflected in the previously stored catalog data 140. The workflow catalog data synchronizer 150 provides a mechanism to maintain these stored catalogs in an updated state. It should be appreciated that the updating of the stored catalog data may occur with regard to only a subset of stored catalogs, e.g., only the stored catalogs that are present in the public catalog data store 192.

As shown in FIG. 1, in some illustrative embodiments in which the public cloud 104 is separated into regions for different geographical and/or data network topology sub-groupings of computing resources of an organization, the hybrid workflow redistributor 100 operates with middleware nodes, e.g., computing devices, 109 of the public cloud 104, by providing one or more region awareness handlers 160, e.g., a single region awareness handler 160 for all regions, or a separate region awareness handler for each defined region of an organization. The region awareness handler(s) 160 comprises logic that is configured to specifically, and automatically, execute computer operations that evaluate the usage metrics and control catalog and catalog schema storage in regional catalog data stores 192 and catalog schema databases 196 of the public cloud 104 based on the usage metrics so that catalogs and corresponding catalog schemas are stored in the corresponding stores 192 and database 196 that are closest or otherwise associated with the regions of the users (client devices) that most utilize the corresponding catalogs. In such a case, the usage metrics maintained in the catalog schema databases may comprise a plurality of different usage metrics, at least one for each region, such that a comparison of such usage metrics may be utilized to determine which region's stores 192 and database 196 should swap in or swap out the generated catalogs and catalog schemas. The region awareness handler(s) 160 may evaluate the usage metrics to identify which catalogs and catalog schemas should be stored in a regional catalog store and corresponding catalog schema database for that region, e.g., the top X used catalogs by users associated with that region. In the case where the public cloud comprises only a single region, then this process is performed for the full set of users of the organization associated with that single region.

In operation, a user of a client computing device 101 may, via a dashboard module 180 accessed by the user via the client computing device 101, submit a user request for performance of a workflow, e.g., tasks used to analyze backend business data 108 and generate results that may be depicted or otherwise output via one or more computer dashboards. The user request is received in the gateway computing device 170 which is configured to implement request routing logic 172. The request routing logic 172 first directs the user request to the public cloud 104 and specifically to the catalog schema database(s) 196 to perform a search operation on the catalog schema database(s) 196 based on the criteria extracted from the user request, e.g., the data types needed to service the request. Search criteria are extracted, by a catalog search engine 182, from the user request by extracting the data type requirements for the user request specified in the natural language content, using corresponding natural language processing and dictionary data structures (not shown), and/or structured fields of the user request. A search of the catalog schema is performed by the catalog search engine 182 to determine whether a previously generated catalog is present in the catalog data store 192, that satisfies the criteria of the user request based on the mappings in the catalog schema database 196, which map the database query/queries used to generate the catalog with the catalog data and the user request criteria that resulted in the database query/queries.

That is, when a catalog is generated to respond to a user request, the catalog schema is also created and stored in a corresponding catalog schema database 194, 196. The catalog schema database 194, 196 may be used as a basis for searching to find previously generated catalogs that will adequately respond to a user request, either in the private cloud or the public cloud, initially looking to the public cloud catalog schema database 196 prior to performing a search of the private cloud catalog schema database 194. Moreover, usage statistics may be maintained in association with various catalog schema database 192, 194 entries in order to perform operations for managing the storage locations of catalog data between the private and public clouds 102, 104, e.g., each time a catalog is used as a basis for providing results to a user request, the usage metrics for that catalog are updated in a corresponding catalog schema database entry, and these usage metrics may be stored for each separate region of the organization present in the public cloud 104 where the identity of the user and/or client computing device (i.e., the requestor) that is the source of the user request are used to identify the corresponding region whose usage metrics are to be updated.

Thus, a user may submit a request and the criteria of the request may be used as a basis to perform a search of the catalog schema database to determine if a catalog has been previously generated for servicing that request. If so, the corresponding catalog data is provided as a result for the user request, thereby eliminating the need to recreate the previously generated catalog data within the private cloud. Corresponding usage metrics may then be updated in the catalog schema database entries in one or both of the private and public cloud catalog schema databases 194, 196. Initially, this search is performed by the catalog schema search engine 182 of the dashboard system 180 based on the search criteria, e.g., data types, extracted from the user request. The catalog schema database 196 in the public cloud stores the catalog schema mappings for only those catalogs stored in the catalog data store 192, which are the catalogs that have been determined to have a usage metric meeting or exceeding one or more threshold usage metric criteria, e.g., a top X used catalog for the corresponding region, or the organization as a whole if only one region is present.

If there is not a previously generated catalog in the catalog data store 192 that satisfies the requirements of the user request and thus, can be used to service the user request, as determined from the search of the catalog schema database 196, then the user request may be redirected, by the gateway computing device 170 routing logic, to the hybrid workflow redistributor 100 of the private cloud 102. The hybrid workflow redistributor 100 may perform a similar search of the private cloud catalog schema database 194 for a previously generated catalog in the private cloud's catalog data store 190 that satisfies the requirements of the user request. It should be appreciated that the catalog data store 190 and catalog schema database 194 may be more extensive than the public catalog data store 192 and public catalog schema database 196 as only those catalogs and catalog schema that meet or exceed criteria for publishing the catalog and catalog schema to the public cloud 104 are redistributed or otherwise published to the public cloud catalog data store 192 and catalog schema database 196.

If a previously generated catalog is identified as present in the catalog data store 190 based on a search of the catalog schema database 194, then that catalog data is retrieved from the catalog data store 190 and returned to the requestor, e.g., user and/or client computing device that submitted the user request via the gateway computing device 170. If a previously generated catalog is not found to exist in the catalog data store 190 based on the search of the catalog schema database 194, then the workflow data analyzer 110, workflow data splitter 120, workflow catalog schema manager 130, workflow catalog data synchronizer 150, and region awareness handlers 160 are employed to perform their operations as previously described above. That is, these components operate to generate the catalog satisfying the user request based on the backend database(s) 106 and business data 108 stored therein, store the resulting catalog data and catalog schema to the stores 190 and 194, determine whether to publish the catalog to the public cloud 104, and in a multi-region organization, identify to which regional stores 192, 196 to redistribute the catalog data and catalog schema, and generate linkages, e.g., pointers, between the catalog data store 190, catalog schema database 194, and the corresponding catalog data and catalog schemas stored in the public cloud stores 192, 196 so that catalog data and usage metrics may be maintained synchronized between entries in the private cloud stores 190, 194 and the corresponding entries in the one or more regional public cloud stores 192, 196. Which catalog data and corresponding schemas are redistributed to be present in the public cloud stores 192, 196, may be determined based on the regional usage statistics of the catalogs as indicated in the corresponding catalog schema database entries in 194, 196, where these usage metrics may be, for example, a "top-click" statistics measure or the like, e.g., if X=5, then a "top X click" statistics measure may indicate that for a particular region, the 5 catalogs having the highest amount of usage by users associated with that region may be redistributed to the public cloud stores 192, 196 associated with that region.

Thus, in response to a determination that a previously generated catalog does not already exist in the private catalog store 190, the workflow data analyzer operates to identify the user request criteria from the user request and analyze access patterns to thereby generate one or more workflow catalog data structure(s) 140 which are stored in the catalog data store 190, and corresponding catalog schema(s) stored in the catalog schema database 194, based on privately held business data 108 of one or more backend databases 106. For example, one or more query language statements, such as SQL statements, for example, may be generated based on the user request's specified criteria and the query language statement(s) may be executed against the one or more backend databases 106 in the private cloud 102. The resulting data obtained as a result of the execution of the query language statement(s) on the backend database(s) 106 may be anonymized or otherwise analyzed to generate resulting catalog data 140 in which private information is not exposed. This anonymization or analysis may be performed by the workflow data splitter 120 which distinguishes between data in the backend database(s) 106 that are private or sensitive information and data that is not, or is derived from such private or sensitive information but which does not expose the underlying private or sensitive information. That is, a user or organization may specify which data types in the backend business data 108 are sensitive or private and such data may be kept from being publicly disclosed to the public cloud 104 through anonymization, filtration, replacement, or other obfuscation techniques. For example, the user or organization may specify which columns and/or rows of data in tables of the backend database's business data 108 are considered private or sensitive.

The resulting catalog data 140 may be stored as an existing catalog in a catalog data store 190 of the private cloud 102 and a corresponding catalog schema entry generated in the catalog schema database 194 of the private cloud 102. These entries in the catalog schema database 194 may include usage metrics or statistics values which may be dynamically updated to reflect the amount of usage within a given time of the catalog data 140, e.g., how many times a user has submitted a request that is serviced by the corresponding catalog data 140, also referred to as a "top-click" statistic or metric. This time period may be a rolling time window such that the metrics are updated dynamically as user requests are processed. Moreover, through the generated linkages, any time a usage metric is updated in one of the private cloud catalog schema database 194 or a public cloud catalog schema database 196, the update is automatically reflected in the other of the private/public catalog schema database 194, 196.

The workflow catalog schema manager 130 operates to provide a linkage between the catalog data 140 in the public cloud store 192 and the catalog data 140 in the private cloud store 190. The workflow catalog schema manager 130 operates to manage the catalog schema database 194 and maintains usage metrics or statistics regarding the usage of catalogs in the catalog data store 190 and the corresponding catalog schemas in the catalog schema database 194 to service user requests. The workflow catalog schema manager 130 further evaluates the usage metrics to determine which catalogs and corresponding catalog schemas should be redistributed to the public cloud 104, and/or regions of the public cloud 104, based on redistribution usage criteria and corresponding evaluation logic. The workflow catalog schema manager 130 may dynamically redistribute catalogs and catalog schemas between the private and public clouds 102, 104 based on usage metric or statistics and redistribution usage criteria, such as by swapping in/out catalogs and catalog schemas in the public cloud catalog and catalog schema stores, potentially on a regional basis.

Thus, when servicing a user request, the system first looks to the public cloud storage for a previously existing catalog that satisfies the requirements of the user request and if one is not present, looks to the private cloud storage for a previously existing catalog that satisfies the request. If one is not found in either place, a catalog and catalog schema are generated and stored in the private cloud and provided as a response to the user request. In a separate process, the workflow catalog schema manager 130 operates to manage the catalogs and catalog schema between the private and public clouds. As another separate process, the workflow catalog data synchronizer 150 operates to update the workflow catalog data present in the private/public clouds for previously generate catalogs so that they are up to date. This updating may be performed automatically on a scheduled basis, or may be performed in response to an automated or manually generated request to perform an update of existing workflow catalog data. Thus, while previously generated catalogs may be stored in catalog data stores 190, 192 along with their catalog schemas being stored in the corresponding entries of catalog schema databases 194, 196 in the private and/or public clouds 102, 104, updates to the underlying business data 108 in the backend databases 106 of the private cloud 102 may occur and would not be reflected in the previously stored catalog data. The workflow catalog data synchronizer 150 provides a mechanism to maintain these stored catalogs in an updated state. It should be appreciated that the updating of the stored catalog data may occur with regard to only a subset of stored catalogs, e.g., only the stored catalogs that are present in the public catalog data store 192.

The region awareness handler(s) 160, which are shown to be present in the hybrid workflow redistributor 100, but may also be distributed to middleware nodes of the public cloud 104, may operate to facilitate and manage the storage of catalog data and corresponding catalog schemas in regional catalog data stores 192 and catalog scheme databases 196 that are closer in distance, in terms of physical and/or network topology distance, to the end users that utilize the catalogs to service requests. The region awareness handler (s) 160 may operate to request catalog data and catalog schemas from the private cloud catalog data store 190 and catalog schema databases 192 that are utilized more often by users of the corresponding regions of the public cloud for storage in the corresponding regional stores. In this way, the latency in accessing these catalogs is reduced as the catalog data and catalog schema are stored more local to the users that are utilizing the catalog data to service user requests.

Thus, as noted above, the illustrative embodiments provide a workflow data redistribution computing tool that operates specifically with regard to a hybrid private/public cloud computing environment and redistributes catalog data and corresponding catalog schemas between the private and public portions of the hybrid private/public cloud. The mechanisms of the improved computing tool of the illustrative embodiments operate to redistribute catalog data to the public cloud stores based on usage metrics and statistics which reduces latency in servicing user requests and improves user experiences. This improvement is further enhanced when regional awareness with regard to regional catalog data stores is implemented with the mechanisms of the illustrative embodiments. The improved computing tool of the illustrative embodiments provides such improvements in user request servicing by a hybrid computing environment while maintaining the security of sensitive data within the private cloud portion of the hybrid computing environment since the sensitive data is not made accessible by, and is not released to, the public cloud, only the OLAP catalog data is made available to the public cloud when user requests are serviced and when usage metrics indicate public cloud redistribution of catalog data is warranted.

Figure 2A:
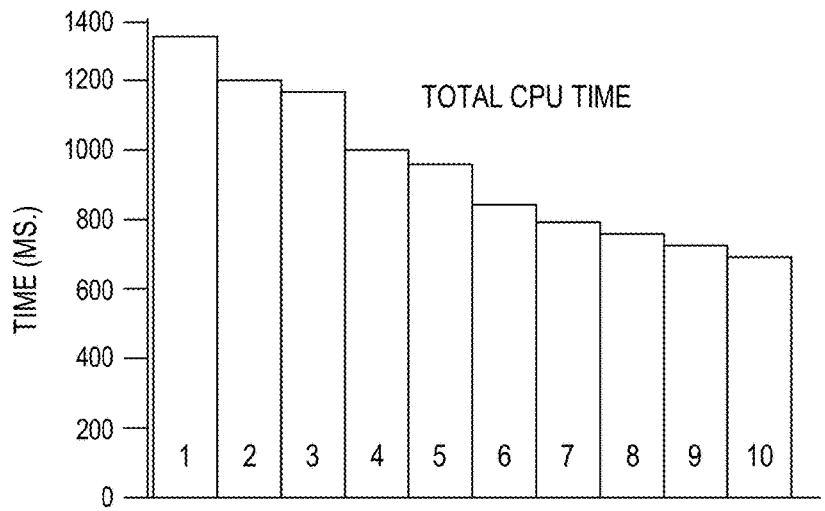
FIG. 2A is an example diagram depicting a graphical output of workflow catalog data for a user request in accordance with one illustrative embodiment.

FIG. 2A is an example diagram depicting a graphical output of workflow catalog data for a user request in accordance with one illustrative embodiment. As noted above, workflow catalog data, or OLAP catalog data, comprises data that services a user request but does not include nay sensitive or private information from the backend business data. The workflow catalog data may be derived from the backend business data and may include portions of backend business data determined to not be sensitive and/or private based on configured criteria as previously discussed above. The workflow catalog data provides a basis through which results for responding to user requests may be output, such as via a graphical user interface and/or one or more dashboards, for use by the user. In the example shown in FIG. 2A, the workflow catalog data comprises statistical data regarding total processor (CPU) time and average processor time for processing various queries for plans in a cache memory.

Figure 2B:
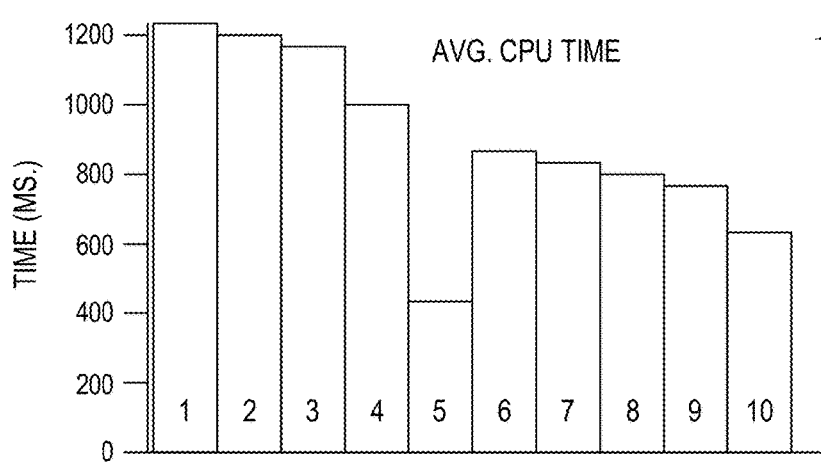
FIG. 2B is an example diagram of a catalog schema for catalog data in accordance with one illustrative embodiment.

FIG. 2B is an example diagram of a catalog schema for catalog data in accordance with one illustrative embodiment. In the example of FIG. 2B, the catalog schema comprises a SQL statement that details the data types for satisfying the corresponding user request, and maps those requirements to the corresponding catalog data and usage metrics, potentially usage metrics for individual regions. The SQL statement is calculated based on the user request criteria. In the catalog schema database, the entry records the mapping between the catalog schema and the SQL statement's "query id". When a new user request is received, a search of the catalog schema database may be performed to check if there is an existing catalog schema entry with a SQL statement having the criteria of the new user request, and if so, obtain the corresponding "query id" to which the catalog schema database entry is mapped. Then the query id may be used to obtain the corresponding catalog data which is also mapped to the query id in the catalog data store.

Figure 3:
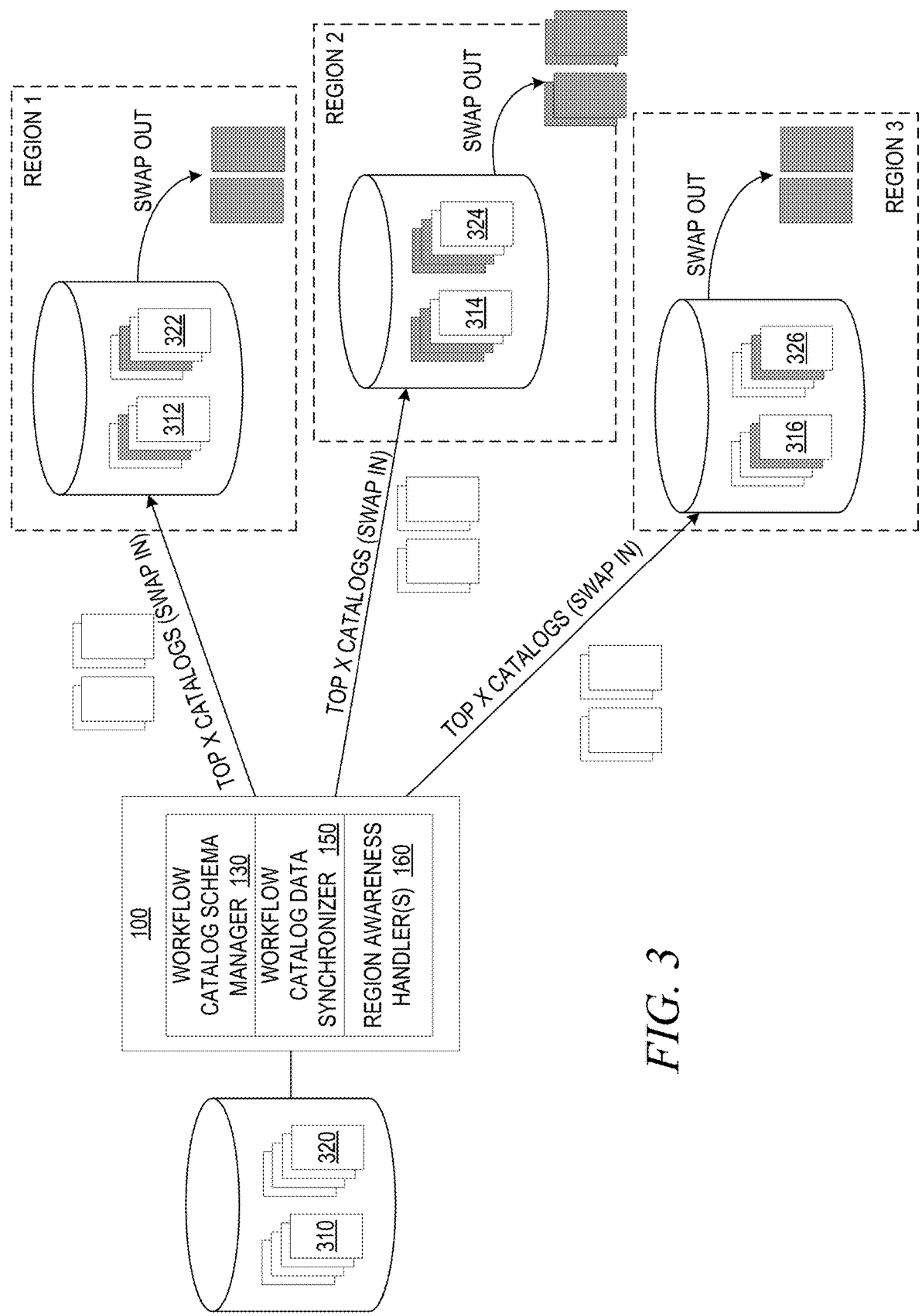
FIG. 3 is an example diagram illustrating a dynamic swapping of catalog data in a public cloud in accordance with one illustrative embodiment.

FIG. 3 is an example diagram illustrating a dynamic swapping of catalog data in a public cloud in accordance with one illustrative embodiment. As shown in FIG. 3, the private cloud stores may store catalogs 310 and corresponding catalog schemas 320 for servicing user requests, as generated based on workflows applied to backend business data 108 in backend database(s) 106 (see FIG. 1). With regard to redistributing portions of catalogs 310 and catalog schemas 320 to one or more regional public cloud data stores, e.g., for one or more regions (regions 1-3 in FIG. 3) of an organization in the public cloud 104, the hybrid workflow redistributor 100, in some illustrative embodiments, evaluates the usage metrics of the various catalog schema entries 320 to identify, for each region, the top X catalogs for that region. This operation is achieved through a combined operation of the workflow catalog schema manager 130, the workflow catalog data synchronizer 150, and the region awareness handler(s) 160, as previously described above.

Thus, for the top X catalogs used by users associated with region 1, the corresponding catalogs 312 and catalog schemas 322 are stored in one or more regional stores, e.g., a regional catalog data store and regional catalog schema database. Similarly, other portions of the catalogs 310 and catalog schemas 320, are redistributed to other regional stores depending on the usage metrics. Thus, a second portion of catalogs 314 and catalog schemas 324 are stored in association with region 2 and a third portion of catalogs 316 and catalog schemas 326 are stored in association with region 3. It should be appreciated that some catalogs and catalog schemas may be present in multiple ones of the regional stores if users in the various regions utilize those catalogs and catalog schemas a sufficient amount.

This swapping in of catalogs and catalog schemas may be performed on an automatic and dynamic basis as usage metrics are updated for the various catalogs and/or on a periodic basis. In addition, such evaluations may further re-evaluate catalogs and catalog schemas stored in the regional public stores to determine if they should be swapped out as they are no longer being sufficiently utilized, e.g., their usage metrics within a given period of time no longer meet or exceed a threshold usage metric. Alternatively, the swapping in of catalogs and catalog schemas may be used to swap out the least utilized catalogs and catalog schemas in order to maintain a number or size of the catalogs and catalog schemas maintained in the various public stores. Any suitable swapping-in and swapping-out methodology may be utilized along with corresponding usage metric criteria and usage metric thresholds.

Figure 4:
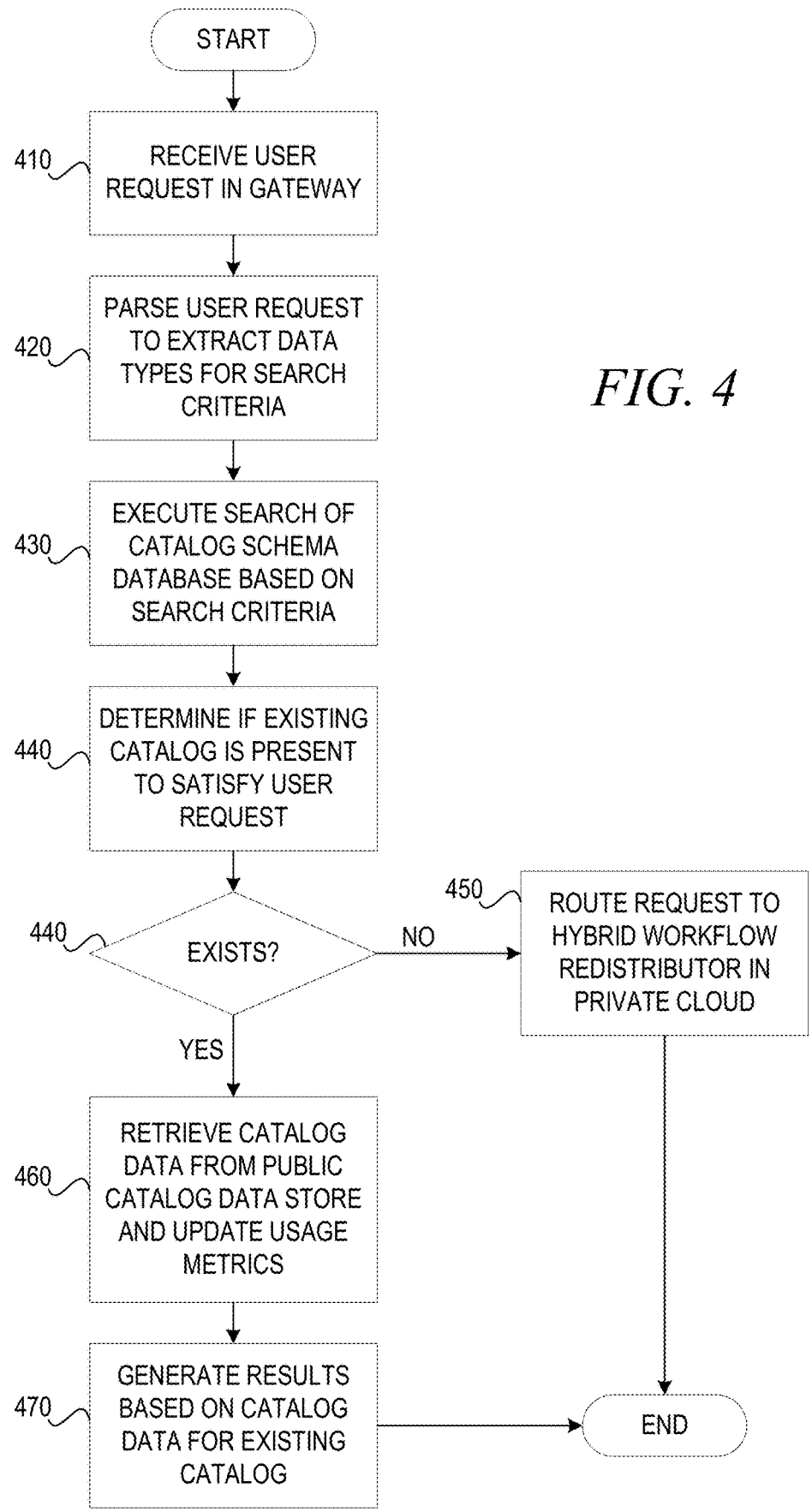
FIG. 4 is a flowchart outlining an example operation of a gateway computing system and catalog search engine in accordance with one illustrative embodiment.

FIG. 4 is a flowchart outlining an example operation of a gateway computing system and catalog search engine in accordance with one illustrative embodiment. The operation outlined in FIG. 4 may be performed in the public cloud portion of the system in accordance with one illustrative embodiment. It should be appreciated that the operations outlined in FIG. 4 are specifically performed automatically by an improved computer tool of the illustrative embodiments and are not intended to be, and cannot practically be, performed by human beings either as mental processes or by organizing human activity. To the contrary, while human beings may initiate the performance of the operation set forth in FIG. 4 and may make use of the results generated as a consequence of the operations set forth in FIG. 4, the operations in FIG. 4 themselves are specifically performed by the improved computing tool in an automated manner.

As shown in FIG. 4, the operation starts with receiving a user request in the gateway computing system (step 410). The user request is parsed to extract data types for search criteria (step 420) and execute a search of catalog schema database based on search criteria (step 430) to determine if there is an existing catalog present to satisfy the user request (step 440). If an existing catalog is not found (step 440), then the user request is routed to the hybrid workflow redistributor in the private cloud (step 450). If an existing catalog is found (step 440), then the catalog data is retrieved form the public catalog data store and usage metrics for the catalog are updated (step 460). Results for returning and servicing the user request are generated based on the catalog data for the existing catalog and returned to the requestor (step 470). The operation then terminates.

Figure 5:
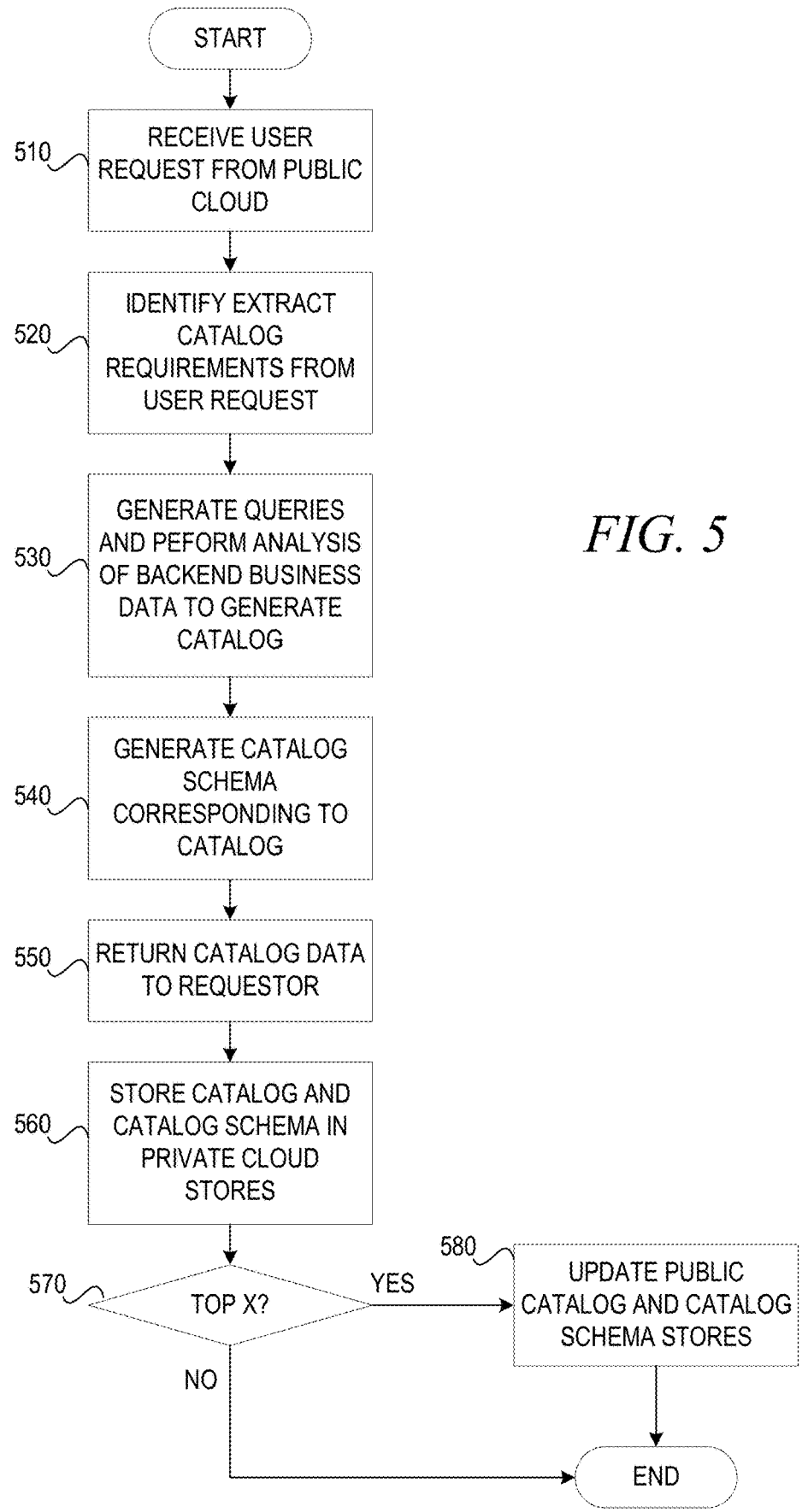
FIG. 5 is a flowchart outlining an example operation of a hybrid computing environment workflow data redistributor in accordance with one illustrative embodiment.

FIG. 5 is a flowchart outlining an example operation of a hybrid computing environment workflow data redistributor in accordance with one illustrative embodiment. The operation outlined in FIG. 5 may be performed in the private cloud portion of the system in accordance with one illustrative embodiment. It should be appreciated that the operations outlined in FIG. 5 are specifically performed automatically by an improved computer tool of the illustrative embodiments and are not intended to be, and cannot practically be, performed by human beings either as mental processes or by organizing human activity. To the contrary, the operations in FIG. 5 themselves are specifically performed by the improved computing tool in an automated manner.

As shown in FIG. 5, the operation starts with receiving a user request in from the public cloud, e.g., from the gateway computing system routing the user request to the private cloud after not finding a catalog for servicing the user request in the public cloud (step 510). Catalog requirements are identified, or extracted, from the user request, e.g., in some cases the search criteria previously identified from the public cloud search may be utilized, while in some cases the user request may be parsed and analyzed to extract such catalog requirements, e.g., data types needed to service the request (step 520). Queries are generated and analysis is performed on the backend business data to generate a catalog that services the user request (step 530). A catalog schema for the generated catalog is created (step 540) and the catalog data is returned to the requestor (step 550). The catalog data and its corresponding catalog schema are stored in the private cloud stores (step 560). Thereafter, a determination is made as to whether the usage metrics for the catalog meet a predetermined threshold X (step 570). If so, the catalog and catalog schema are updated to the public stores (step 580). Thereafter, or if the usage metrics do not meet or exceed the threshold, the operation then terminates.

As noted above, an example hybrid computing environment in which aspects of the illustrative embodiments may be implemented and/or employed, is a hybrid cloud computing environment in which there are private and public portions, or separate private and public cloud computing environments that together compose the hybrid cloud computing environment. Although this disclosure includes a detailed description on cloud computing, implementation of the teachings recited herein are not limited to a cloud computing environment. Rather, embodiments of the present invention are capable of being implemented in conjunction with any other type of computing environment in which there are private and public portions provided in a hybrid computing environment manner, now known or later developed.

As discussed previously, cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure comprising a network of interconnected nodes.

Figure 6:
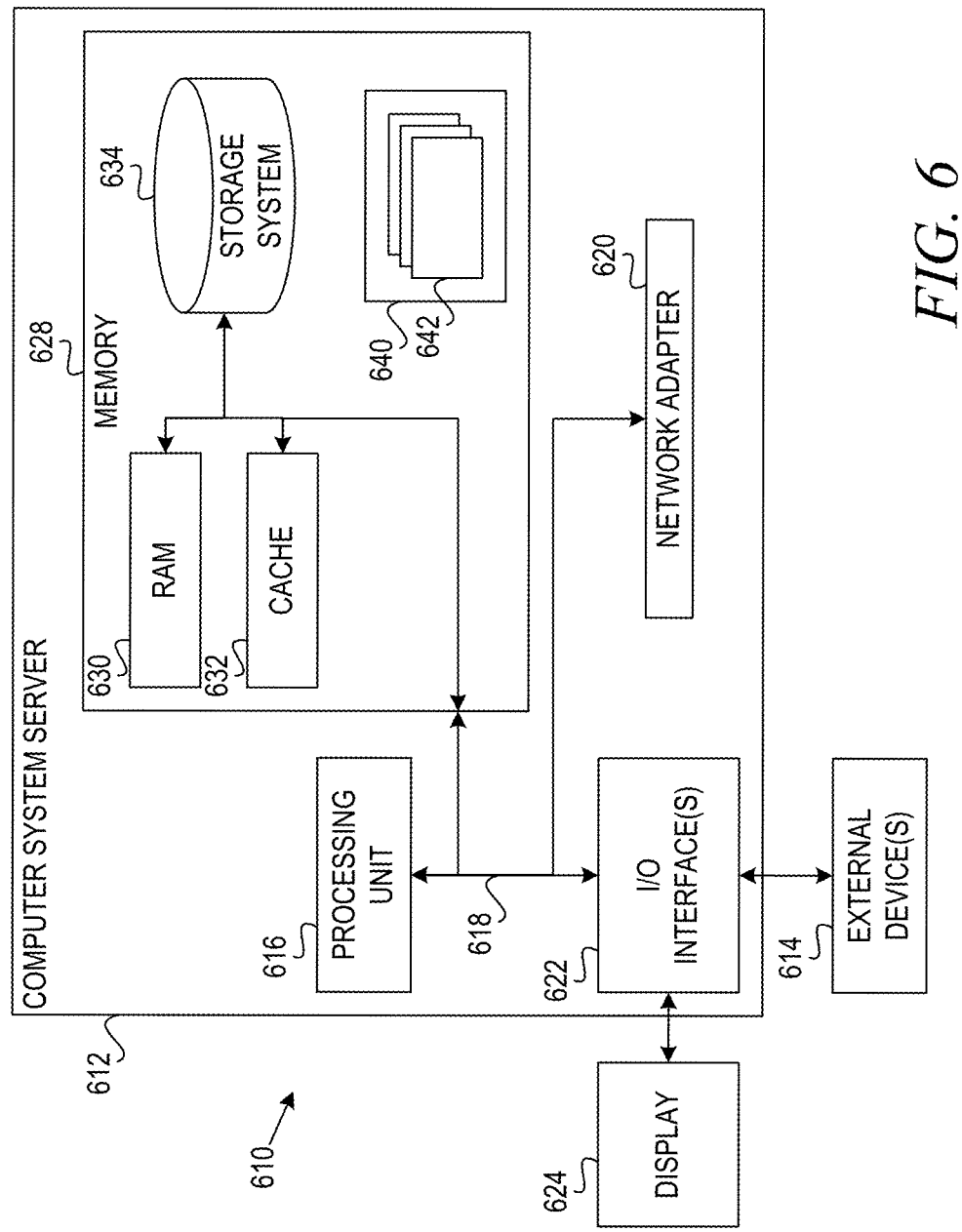
FIG. 6 depicts a cloud computing node according to an illustrative embodiment.

Referring now to FIG. 6, a schematic of an example of a cloud computing node is shown. Cloud computing node 610 is only one example of a suitable cloud computing node and is not intended to suggest any limitation as to the scope of use or functionality of embodiments of the invention described herein. Regardless, cloud computing node 610 is capable of being implemented and/or performing any of the functionality set forth hereinabove.

In cloud computing node 610 there is a computer system/server 612, which is operational with numerous other general purpose or special purpose computing system environments or configurations. Examples of well-known computing systems, environments, and/or configurations that may be suitable for use with computer system/server 612 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 612 may be described in the general context of computer system executable instructions, such as program modules, being executed by a computer system. Generally, program modules may include routines, programs, objects, components, logic, data structures, and so on that perform particular tasks or implement particular abstract data types. Computer system/server 612 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 6, computer system/server 612 in cloud computing node 610 is shown in the form of a general-purpose computing device. The components of computer system/server 612 may include, but are not limited to, one or more processors or processing units 616, a system memory 628, and a bus 618 that couples various system components including system memory 628 to processor 616.

Bus 618 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 612 typically includes a variety of computer system readable media. Such media may be any available media that is accessible by computer system/server 612, and it includes both volatile and non-volatile media, removable and non-removable media. System memory 628 can include computer system readable media in the form of volatile memory, such as random access memory (RAM) 30 and/or cache memory 632. Computer system/server 612 may further include other removable/non-removable, volatile/non-volatile computer system storage media. By way of example only, storage system 634 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 618 by one or more data media interfaces. As will be further depicted and described below, memory 628 may include at least one program product having a set (e.g., at least one) of program modules that are configured to carry out the functions of embodiments of the invention.

Program/utility 640, having a set (at least one) of program modules 642, may be stored in memory 628 by way of example, and not limitation, as well as an operating system, one or more application programs, other program modules, and program data. Each of the operating system, one or more application programs, other program modules, and program data or some combination thereof, may include an implementation of a networking environment. Program modules 642 generally carry out the functions and/or methodologies of embodiments of the invention as described herein.

Computer system/server 612 may also communicate with one or more external devices 614 such as a keyboard, a pointing device, a display 624, etc.; one or more devices that enable a user to interact with computer system/server 612; and/or any devices (e.g., network card, modem, etc.) that enable computer system/server 612 to communicate with one or more other computing devices. Such communication can occur via Input/Output (I/O) interfaces 622. Still yet, computer system/server 612 can communicate with one or more networks such as a local area network (LAN), a general wide area network (WAN), and/or a public network (e.g., the Internet) via network adapter 20. As depicted, network adapter 620 communicates with the other components of computer system/server 612 via bus 618. It should be understood that although not shown, other hardware and/or software components could be used in conjunction with computer system/server 612. Examples, include, but are not limited to: microcode, device drivers, redundant processing units, external disk drive arrays, RAID systems, tape drives, and data archival storage systems, etc.

Figure 7:
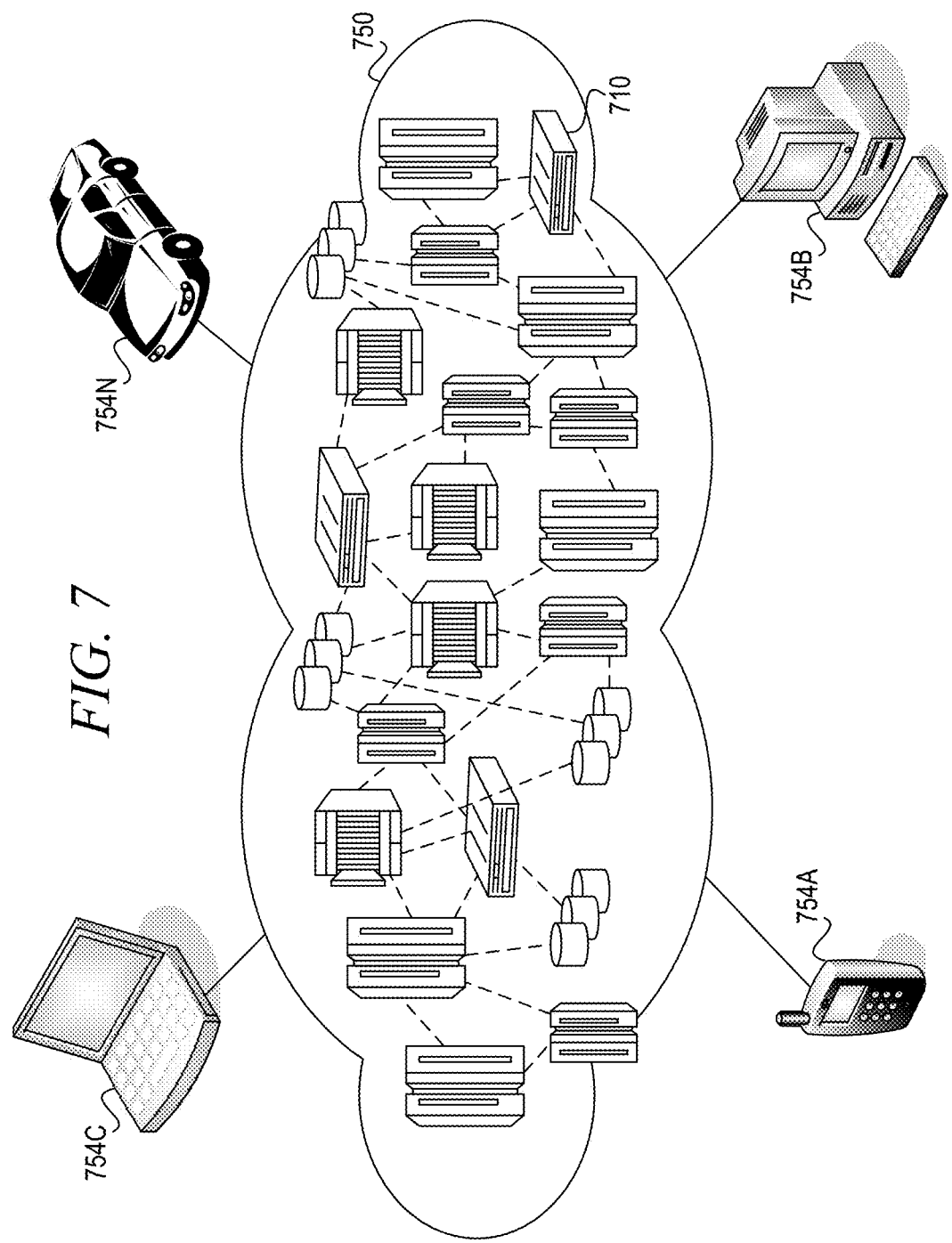
FIG. 7 depicts a cloud computing environment according to an illustrative embodiment.

Referring now to FIG. 7, illustrative cloud computing environment 750 is depicted. As shown, cloud computing environment 750 comprises one or more cloud computing nodes 710 with which local computing devices used by cloud consumers, such as, for example, personal digital assistant (PDA) or cellular telephone 754A, desktop computer 754B, laptop computer 754C, and/or automobile computer system 754N may communicate. Nodes 710, which may be nodes similar to node 610 of FIG. 6, may communicate with one another. They may be grouped (not shown) physically or virtually, in one or more networks, such as Private, Community, Public, or Hybrid clouds as described hereinabove, or a combination thereof. This allows cloud computing environment 750 to offer infrastructure, platforms and/or software as services for which a cloud consumer does not need to maintain resources on a local computing device. It is understood that the types of computing devices 754A-N shown in FIG. 7 are intended to be illustrative only and that computing nodes 710 and cloud computing environment 750 can communicate with any type of computerized device over any type of network and/or network addressable connection (e.g., using a web browser).

Figure 8:
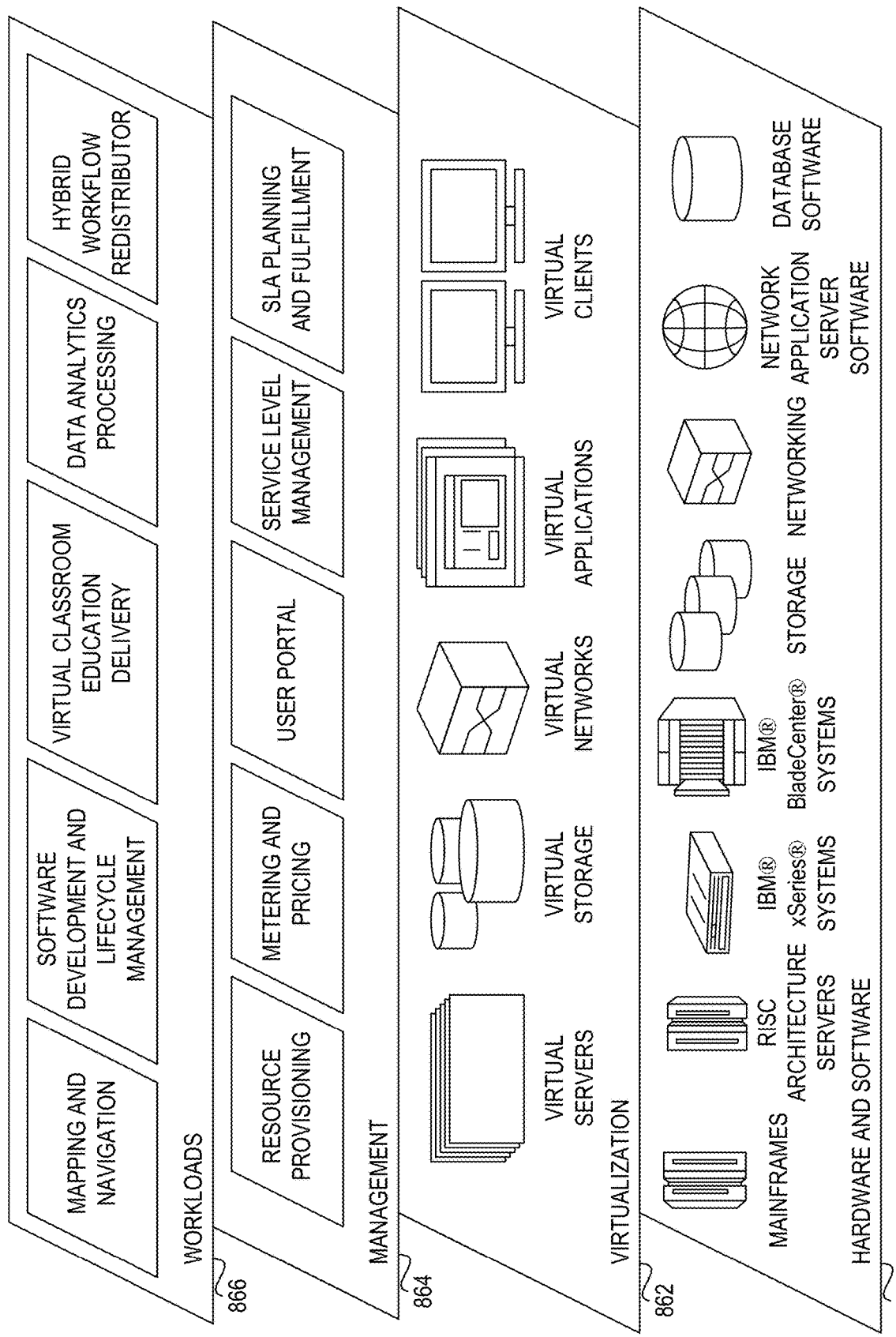
FIG. 8 depicts abstraction model layers according to an illustrative embodiment.

Referring now to FIG. 8, a set of functional abstraction layers provided by cloud computing environment 750 (FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 860 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM Web Sphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 862 provides an abstraction layer from which the following examples of virtual entities may be provided: virtual servers; virtual storage; virtual networks, including virtual private networks; virtual applications and operating systems; and virtual clients.

In one example, management layer 864 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 866 provides examples of functionality for which the cloud computing environment may be utilized. Examples of workloads and functions which may be provided from this layer include: mapping and navigation; software development and lifecycle management; virtual classroom education delivery; data analytics processing; transaction processing; and, in accordance with one or more illustrative embodiments as described above, one or more components of a hybrid workload redistributor, such as that shown in FIG. 1.

Thus, the illustrative embodiments provide mechanisms for redistributing catalogs and catalog schemas between private and public clouds of a hybrid cloud computing environment. The redistribution mechanisms perform such redistribution to optimize servicing user requests while still maintaining privacy and security of sensitive or private information in the private cloud. The redistribution mechanisms reduce latency in servicing user requests and thereby improve user experiences.

As described above, the illustrative embodiments of the present invention are specifically directed to an improved computing tool that automatically selects a medical image, or slice, from a medical imaging study file comprising a plurality of medical imaging slices, e.g., a scan, and then performs segmentation and HU value evaluations which may be used to determine whether, and how, to route the medical imaging study file to an appropriate CAD system. All of the functions of the illustrative embodiments as described herein are intended to be performed using automated processes without human intervention. While a human being, e.g., a patient, may be the subject of the medical imaging, the illustrative embodiments of the present invention are not directed to actions performed by the patient, but rather logic and functions performed specifically by the improved computing tool on the medical images taken of the patient. Moreover, even though the present invention may provide an output to a CAD system that ultimately assists human beings in evaluating the medical condition of the patient, the illustrative embodiments of the present invention are not directed to actions performed by the human being viewing the results of the processing performed by the CAD system, but rather to the specific operations performed by the specific improved computing tool of the present invention which facilitate the processing by the CAD system in an improved manner and ultimately the generation of the results of the CAD system processing that assists the human being. Thus, the illustrative embodiments are not organizing any human activity, but are in fact directed to the automated logic and functionality of an improved computing tool.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a communication bus, such as a system bus, for example. The memory elements can include local memory employed during actual execution of the program code, bulk storage, and cache memories which provide temporary storage of at least some program code in order to reduce the number of times code must be retrieved from bulk storage during execution. The memory may be of various types including, but not limited to, ROM, PROM, EPROM, EEPROM, DRAM, SRAM, Flash memory, solid state memory, and the like.

Input/output or I/O devices (including but not limited to keyboards, displays, pointing devices, etc.) can be coupled to the system either directly or through intervening wired or wireless I/O interfaces and/or controllers, or the like. I/O devices may take many different forms other than conventional keyboards, displays, pointing devices, and the like, such as for example communication devices coupled through wired or wireless connections including, but not limited to, smart phones, tablet computers, touch screen devices, voice recognition devices, and the like. Any known or later developed I/O device is intended to be within the scope of the illustrative embodiments.

Network adapters may also be coupled to the system to enable the data processing system to become coupled to other data processing systems or remote printers or storage devices through intervening private or public networks. Modems, cable modems and Ethernet cards are just a few of the currently available types of network adapters for wired communications. Wireless communication based network adapters may also be utilized including, but not limited to, 802.11 a/b/g/n wireless communication adapters, Bluetooth wireless adapters, and the like. Any known or later developed network adapters are intended to be within the spirit and scope of the present invention.

The description of the present invention has been presented for purposes of illustration and description, and is not intended to be exhaustive or limited to the invention in the form disclosed. Many modifications and variations will be apparent to those of ordinary skill in the art without departing from the scope and spirit of the described embodiments. The embodiment was chosen and described in order to best explain the principles of the invention, the practical application, and to enable others of ordinary skill in the art to understand the invention for various embodiments with various modifications as are suited to the particular use contemplated. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, in a data processing system, for workflow data redistribution in a hybrid distributed data processing system environment comprising a private portion of the hybrid distributed data processing system environment and a public portion of the hybrid distributed data processing system environment, the method comprising:

parsing a received user request, that is serviced by a workflow executed by one or more computing devices of the hybrid distributed data processing system environment, to extract criteria of the workflow for servicing the received user request;

determining whether a catalog data structure exists in a public catalog data store of the public portion that satisfies the criteria of the workflow, wherein
the determining comprises searching a public catalog schema database of the public portion for an entry having a definition of metadata that matches the criteria of the workflow corresponding to the received user request;

processing, based on the determining that the catalog data structure does not exist in the public catalog data store, the received user request in a workflow manager computing system of the private portion to generate a catalog that satisfies the criteria of the workflow;

generating catalog data that provides non-private data, and a catalog schema corresponding to the catalog data, wherein
the catalog schema comprises a definition of metadata of the catalog data that maps the criteria of the workflow with the catalog data;

processing, based on the non-private data, the received user request to generate a result that is returned to a source computing system from which the received user request was received; and redistributing at least one portion of the catalog by storing the at least one portion of the catalog in the public catalog data store of the public portion, wherein
the at least one portion of the catalog comprises at least one of data from at least one backend database of the private portion that does not include private data or data derived from the private data stored in the at least one backend database of the private portion that does not include the private data.

2. The method of claim 1, wherein the workflow data comprises online transaction processing (OLTP) data and online analytical processing (OLAP) catalog data, and wherein the at least one portion of the catalog comprises the OLAP catalog data but not the OLTP data.

3. The method of claim 1, wherein the generating of the catalog further comprises:

determining if a previously generated catalog exists in a private catalog data store that satisfies the criteria of the workflow;

in a case where the previously generated catalog exists in the private catalog data store, returning the previously generated catalog from the private catalog data store to a computing device in the public portion to service the received user request, and updating a usage statistic value of the catalog in a corresponding entry of the private catalog data store, wherein the one or more computing devices includes the computing device; and in a case where the previously generated catalog does not exist in the private catalog data store, generating the catalog from a processing of backend database data in the private portion, and storing the catalog in the private catalog data store.

4. The method of claim 3, further comprising determining if the usage statistic value of the corresponding entry is equal to or above a predetermined threshold usage statistic value, wherein
based on the usage statistic value of the corresponding entry equal to or above the predetermined threshold usage statistic value, performing the redistributing of the at least one portion of the catalog by storing the at least one portion of the catalog in the public catalog data store of the public portion.

5. The method of claim 4, wherein the predetermined threshold usage statistic value is a top-X threshold usage statistic value specifying a predetermined number of highest usage catalogs, where X is the predetermined number of highest usage catalogs.

6. The method of claim 3, further comprising:
linking an entry in the private catalog data store with a corresponding entry in the public catalog data store; and
automatically updating the catalog data corresponding to the entry in the public catalog data store based on updates to the linked entry in the private catalog data store, wherein
the updates to the linked entry in the private catalog data store are based on the linking between the entry in the private catalog data store and the corresponding entry in the public catalog data store.

7. The method of claim 1, further comprising
a plurality of public catalog data stores, wherein
the plurality of public catalog data stores includes the public catalog data store, and
each public catalog data store, of the plurality of public catalog data stores, is associated with a different region of an organization,
the method is performed on a regional basis for user requests originating from the one or more computing devices associated with different regions of the organization.

8. The method of claim 1, wherein the hybrid distributed data processing system environment is a hybrid cloud computing environment.

9. A computer program product comprising a computer readable storage medium having program instructions stored therein, wherein the program instructions, when executed on a computing device, cause the computing device to:
parse a received user request, that is serviced by a workflow executed by one or more computing devices of a hybrid distributed data processing system environment, to extract criteria of the workflow for servicing the received user request, wherein the one or more computing devices includes the computing device;
determine whether a catalog data structure exists in a public catalog data store of a public portion of the hybrid distributed data processing system environment that satisfies the criteria of the workflow, wherein
the determination comprises search of a public catalog schema database of the public portion for an entry having a definition of metadata that matches the criteria of the workflow corresponding to the received user request;
process, based on the determination that the catalog data structure does not exist in the public catalog data store, the received user request in a workflow manager computing system of a private portion of the hybrid distributed data processing system environment to generate a catalog that satisfies the criteria of the workflow;
generate catalog data that provides non-private data, and a catalog schema corresponding to the catalog data, wherein
the catalog schema comprises a definition of metadata of the catalog data that maps the criteria of the workflow with the catalog data;
process, based on the non-private data, the received user request to generate a result that is returned to a source computing system from which the received user request was received; and
redistribute at least one portion of the catalog by storage of the at least one portion of the catalog in the public catalog data store of the public portion, wherein
the at least one portion of the catalog comprises at least one of data from at least one backend database of the private portion that does not include private data or data derived from the private data stored in the at least one backend database of the private portion that does not include the private data.

10. The computer program product of claim 9, wherein data of the workflow comprises online transaction processing (OLTP) data and online analytical processing (OLAP) catalog data, and wherein the at least one portion of the catalog comprises the OLAP catalog data but not the OLTP data.

11. The computer program product of claim 9, wherein the generation of the catalog comprises:
determination that a previously generated catalog exists in a private catalog data store that satisfies the criteria of the workflow;
in a case where the previously generated catalog exists in the private catalog data store, return the previously generated catalog from the private catalog data store to the computing device in the public portion to service the received user request, and update a usage statistic value of the catalog in a corresponding entry of the private catalog data store; and
in a case where the previously generated catalog does not exist in the private catalog data store, generate the catalog from a processing of backend database data in the private portion, and store the catalog in the private catalog data store.

12. The computer program product of claim 11, wherein the program instructions further cause the computing device to determine if the usage statistic value of the corresponding entry is equal to or above a predetermined threshold usage statistic value, wherein
based on the usage statistic value of the corresponding entry being equal to or above the predetermined threshold usage statistic value, perform the redistribution of the at least one portion of the catalog by storage of the at least one portion of the catalog in the public catalog data store of the public portion.

13. The computer program product of claim 12, wherein the predetermined threshold usage statistic value is a top-X threshold usage statistic value that specifies a predetermined number of highest usage catalogs, where X is the predetermined number of highest usage catalogs.

14. The computer program product of claim 11, wherein the program instructions further cause the computing device to:
link an entry in the private catalog data store with a corresponding entry in the public catalog data store; and automatically update the catalog data corresponding to the entry in the public catalog data store based on updates to the linked entry in the private catalog data store, wherein the updates to the linked entry in the private catalog data store are based on the linkage between the entry in the private catalog data store and the corresponding entry in the public catalog data store.

15. The computer program product of claim 9, further comprising a plurality of public catalog data stores, wherein the plurality of public catalog data stores includes the public catalog data store, each public catalog data store, of the plurality of public catalog data stores, is associated with a different region of an organization, and the execution of the program instructions is on a regional basis for user requests originating from the one or more computing devices associated with different regions of the organization.

16. An apparatus, comprising:

at least one processor; and at least one memory coupled to the at least one processor, wherein the at least one memory comprises instructions which, when executed by the at least one processor, cause the at least one processor to:

parse a received user request, that is serviced by a workflow executed by one or more computing devices of a hybrid distributed data processing system environment, to extract criteria of the workflow for servicing the received user request;

determine whether a catalog data structure exists in a public catalog data store of a public portion of the hybrid distributed data processing system environment that satisfies the criteria of the workflow, wherein the determination comprises search of a public catalog schema database of the public portion for an entry having a definition of metadata that matches the criteria of the workflow corresponding to the received user request;

process, based on the determination that the catalog data structure does not exist in the public catalog data store, the received user request in a workflow manager computing system of a private portion of the hybrid distributed data processing system environment to generate a catalog that satisfies the criteria of the workflow;

generate catalog data that provides non-private data, and a catalog schema corresponding to the catalog data, wherein the catalog schema comprises a definition of metadata of the catalog data that maps the criteria of the workflow with the catalog data;

process, based on the non-private data, the received user request to generate a result that is returned to a source computing system from which the received user request was received; and redistribute at least one portion of the catalog by storing the at least one portion of the catalog in the public catalog data store of the public portion, wherein the at least one portion of the catalog comprises at least one of data from at least one backend database of the private portion that does not include private data or data derived from the private data stored in the at least one backend database of the private portion that does not include the private data.

* * * * *